United States Patent [19]

Pike

[11] 4,452,766
[45] Jun. 5, 1984

[54] DOUBLE ALKALI PROCESS FOR REMOVAL OF SULFUR DIOXIDE FROM GAS STREAMS

[75] Inventor: Daniel E. Pike, Harrington Park, N.J.

[73] Assignee: AirPol, Inc., Englewood, N.J.

[21] Appl. No.: 412,941

[22] Filed: Aug. 30, 1982

[51] Int. Cl.$^3$ .............................................. C01B 17/00
[52] U.S. Cl. ..................................... 423/242; 423/166; 423/421; 423/430
[58] Field of Search .......... 423/242 A, 242 R, 244 A, 423/244 R, 421, 522, 166, 430, 432

[56] References Cited

U.S. PATENT DOCUMENTS

| | | |
|---|---|---|
| 1,271,899 | 7/1918 | Howard et al. |
| 3,477,815 | 11/1969 | Miller et al. ........................... 23/178 |
| 3,485,581 | 12/1969 | Miller et al. ........................... 23/178 |
| 3,542,511 | 11/1970 | Shah ...................................... 23/168 |
| 3,607,033 | 9/1971 | Shah ...................................... 23/167 |
| 3,642,445 | 2/1972 | Muter et al. ........................... 423/244 |
| 3,653,812 | 4/1972 | Schneider et al. .................. 23/2 SQ |
| 3,775,532 | 11/1973 | Shah ...................................... 423/242 |
| 3,852,410 | 12/1974 | Rivers et al. .......................... 423/244 |
| 3,870,781 | 3/1975 | Klein et al. ............................ 423/242 |
| 3,873,532 | 3/1975 | Dahlstrom et al. .................. 423/242 |
| 3,911,084 | 10/1975 | Wall et al. ............................. 423/242 |
| 3,944,649 | 3/1976 | Field et al. ............................ 423/242 |
| 3,989,797 | 11/1976 | Brady et al. .......................... 423/242 |
| 4,021,202 | 5/1977 | Field et al. ............................ 23/260 |
| 4,231,995 | 11/1980 | Campbell et al. ................... 423/242 |
| 4,313,924 | 2/1982 | Pike ...................................... 423/242 |

FOREIGN PATENT DOCUMENTS 49-48599  5/1974  Japan ............................... 423/247 A

*Primary Examiner*—Gregory A. Heller

*Attorney, Agent, or Firm*—Fitzpatrick, Cella, Harper & Scinto

[57] ABSTRACT

An improved double alkali process is disclosed which is useful for the removal of sulfur dioxide from gas streams, especially waste gas streams derived from coal-fired plants which also contain entrained fine particles of ash which contain alkali, which process comprises leaching soluble alkali from said entrained fine particles to establish an aqueous alkali scrubbing solution, scrubbing the resulting gas stream with said scrubbing solution, which circulates between said leaching and scrubbing steps, followed by bleeding off a portion of the resulting scrubber effluent to a regeneration system wherein the alkali scrubbing solution is regenerated. The scrubber effluent contains a relatively higher amount of alkali bisulfite and regeneration is in two main stages: a first stage wherein the alkali bisulfite is oxidized to alkali sulfate with formation of sulfuric acid followed by reaction of the acid with a calcium carbonate slurry to produce insoluble calcium carbonate and carbon dioxide gas; and a second stage wherein lime is added and reacts with the alkali sulfate to form insoluble calcium sulfate and alkali hydroxide. After thickening and filtering the reaction product of the second stage regeneration step, alkali carbonate is added thereto in a clarifier in a softening step (i.e., to remove dissolved calcium as a solid) which forms an overflow containing alkali hydroxide which is recycled to the scrubbing step and an (insoluble) calcium carbonate slurry which in turn is recycled to the first stage regeneration reaction. The primary advantage of the present invention is the total elimination for any alkali make-up to the system. This is accomplished by forming in situ the alkali scrubbing solution using the alkali contained in the entrained fine particles carried to the scrubber.

15 Claims, 1 Drawing Figure

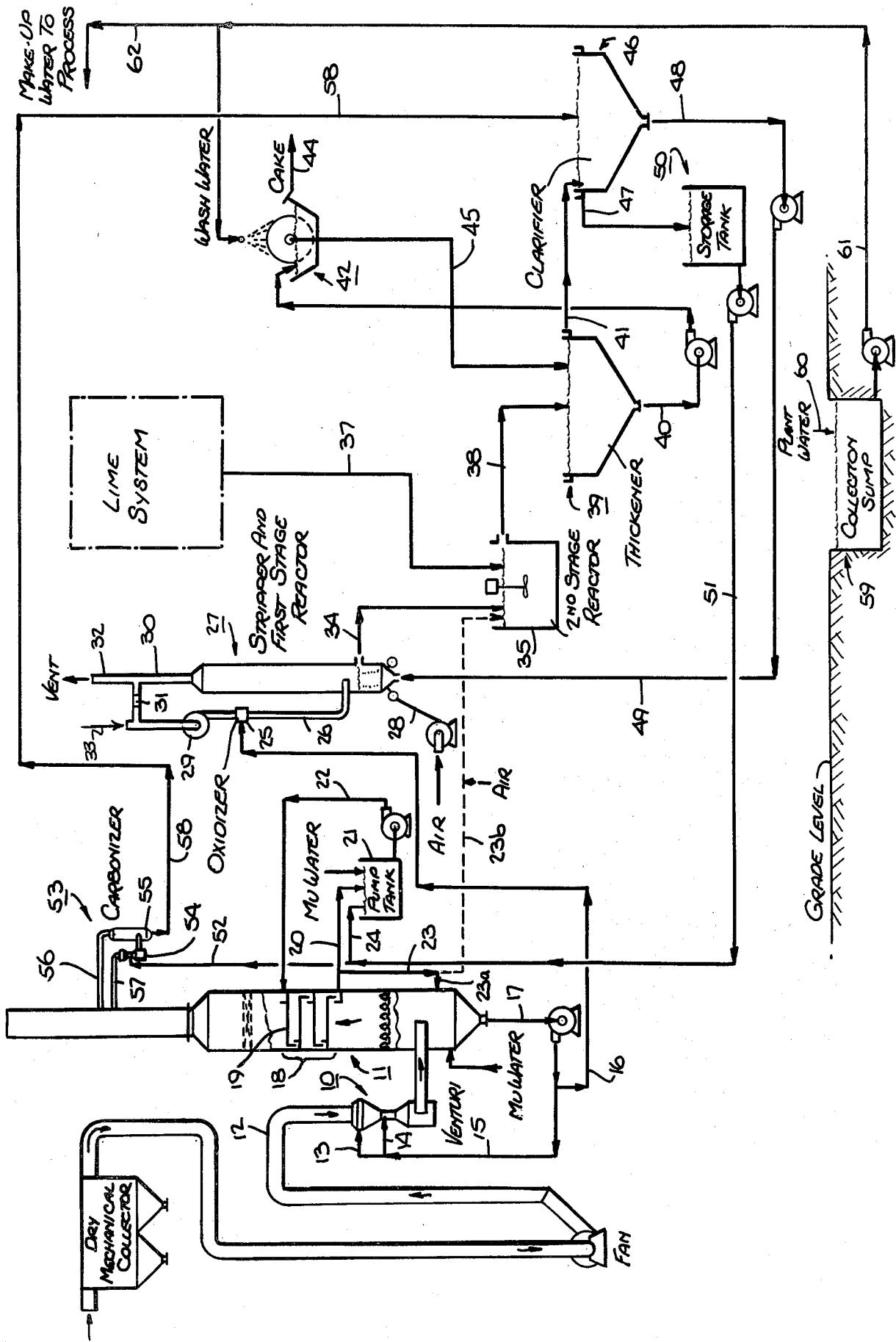

DOUBLE ALKALI PROCESS FOR REMOVAL OF SULFUR DIOXIDE FROM GAS STREAMS

BACKGROUND OF THE INVENTION

1. Field of the Invention

This invention relates to a process for removing pollutants from gas streams; more particularly, it relates to a process for removing sulfur oxides from waste gas streams containing same. In a preferred embodiment, this invention relates to an improved double alkali process for removing sulfur dioxide from waste gas streams containing same.

2. Description of the Prior Art

For various reasons, it is necessary and desirable to remove pollutants such as sulfur oxides, particularly sulfur dioxide ($SO_2$), from gas streams containing same. A prime source of such gas streams comprises the waste gases derived from the combustion of sulfur-containing fuels, although they can also be generated by other gas producing processes.

Many different processes have been suggested for removing sulfur oxides such as sulfur dioxide from waste gases including, for example, scrubbing with a solution of sodium carbonate or sodium hydroxide; scrubbing with lime or a limestone slurry; or by the so-called double alkali process. The first process is simple but its application is limited since the resulting dissolved solids must be treated and fed to waste in a liquid stream. The lime or limestone scrubbing process produces a low-solubility solid waste, but although the cost of scrubbing chemicals is low, the capital requirements are high due to the high circulation rates required and the possibility of deposition of solid scale in various parts of the system which necessitates periodic cleaning and/or replacement.

The double alkali process remedies some of these deficiencies and generally comprises scrubbing the sulfur oxide-containing gas with an alkali such as a soluble sodium or potassium solution, followed by the addition of another alkali such as lime to at least a portion of the resulting scrubber effluent to regenerate the alkali scrubbing solution. The primary advantage of the double alkali process is that the scrubbing step produces only soluble materials and that insoluble materials are formed only in areas outside the scrubber.

A double alkali process is disclosed in U.S. Pat. No. 3,911,084. As disclosed therein, a circulating aqueous extracting/scrubbing solution of sodium sulfite and sodium bisulfite is provided having a specified pH of 6–7. Make-up for the extracting solution may be obtained using a soluble alkali sodium compound solution with a pH of 8–12. Upon contact with the sulfur dioxide-containing gas stream, $SO_2$ is absorbed by the extracting/scrubbing solution and an extract is formed having a relatively lower pH and a relatively higher sodium bisulfite content. At least a portion of the extract is regenerated in a single step by reaction with a calcium compound such as lime to form a slurry containing dissolved sodium sulfite and solid calcium sulfite and having a pH of 8–10. After separating solids therefrom, the regenerated sodium sulfite solution is mixed with the circulating extracting/scrubbing solution to maintain is pH at 6–7. However, such double alkali processes were deficient in that the regeneration efficiency was not high and a predominantly sulfite filter cake was produced which is difficult to handle.

Commonly-assigned U.S. Pat. No. 4,313,924 remedies such deficiencies with an improved multi-stage regeneration procedure using lime to regenerate sulfite from bisulfite. The bleed from the scrubbing step which is subjected to regeneration has a low pH and hence can dissolve more lime thereby increasing the lime utilization efficiency. In the regeneration procedure, a lime slurry is separated into a slurry of coarser lime particles and a second portion which contains very fine lime particles. The main regeneration is accomplished by adding the coarse lime slurry to the scrubber bleed. Due to the low pH in this reaction, not all the bisulfite is regenerated to sulfite. However, any remaining bisulfite is regenerated to sulfite in later regeneration steps by reaction with the second portion of the lime slurry in order to precipitate as much calcium as possible in the form of sulfate.

Other processes for removing sulfur dioxide from waste gases are disclosed in, for example, U.S. Pat. Nos. 3,775,532; 3,653,812; 3,477,815; 3,485,581; 3,989,797; 3,944,649; 4,021,202; 3,542,511; 3,607,033; 3,622,443; 1,271,899; and Japanese Patent No. 49-48599.

Most prior art sodium-based double alkali processes utilize caustic (i.e., NaOH) or soda ash (i.e., sodium carbonate, $Na_2CO_3$) as make-up to the scrubbing solution. Such a scrubbing solution always contains sodium bisulfite ($NaHSO_3$) and sodium sulfite ($Na_2SO_3$) since the reactions shown in the following equations (1) and (2) occur spontaneously and reaction (3) represents the main $SO_2$ absorption reaction:

$$Na_2CO_3 + NaHSO_3 \rightarrow 2Na_2SO_3 + CO_2 + H_2O \quad (1)$$

$$NaOH + NaHSO_3 \rightarrow Na_2SO_3 + H_2O \quad (2)$$

$$SO_2 + Na_2SO_3 + H_2O \rightarrow 2NaHSO_3 \quad (3)$$

In addition, the scrubbing solution may also contain sodium sulfate ($Na_2SO_4$) due to oxidation of sodium sulfite by any free oxygen in the gases and also because of the possible formation of sodium sulfate during regeneration which is recycled to the scrubbing step. Therefore, as a result of the scrubbing or absorption step, an aqueous solution is produced containing relatively less sodium sulfite, relatively more sodium bisulfite and some sodium sulfate.

In one possible manner of regeneration, a calcium compound such as lime, $Ca(OH)_2$, is added and reacts with the sodium bisulfite forming solid calcium sulfite ($CaSO_3$) and regenerating sodium sulfite as shown in equation (4):

$$2NaHSO_3 + Ca(OH)_2 \rightarrow CaSO_3 + Na_2SO_3 + H_2O \quad (4)$$

However, depending on the pH and other conditions of the regenerating reaction, one or both of solid calcium sulfate ($CaSO_4$) and dissolved sodium sulfate may be formed. Specifically, at a pH of less than 8 and higher than 10, a greater portion of solid calcium sulfate tends to form rather than solid calcium sulfite but since the former is more water soluble than the latter and hence tends to go back into solution as sodium sulfate, while more calcium sulfite precipitates, a solid phase equilibrium is reached. Hence, depending predominantly on the pH of the regeneration, some sodium sulfate may be formed in the thickener and recycled to the scrubbing step with the regenerated sodium sulfite. In fact, the sodium sulfate concentration is permitted to equilibrate in the process disclosed in the aforementioned U.S. Pat. No. 3,911,084, in order to reduce the undesired removal of sulfite/bisulfite values with the solid precipitate.

Most prior art double alkali systems require a "softening" step to remove or reduce the concentration of dissolved calcium ions to prevent precipitation of calcium salts in the scrubber which foul the system. This is usually done in a clarifier by adding soda ash, $Na_2CO_3$, a relatively expensive form of active sodium, wherein the carbonate ions react with the dissolved calcium ions to precipitate calcium in the form of calcium carbonate, $CaCO_3$, which is extremely insoluble in water. Since other losses of sodium are usually minimal, the amount of soda ash used in the softening step often controls the amount required for the process. Hence, most prior art double alkali processes often do only a minimum amount of softening in view of the expense of soda ash and therefore frequently experience scale problems due to precipitated calcium salts.

U.S. Pat. No. 4,231,995 discloses an ammonia double alkali process which includes scrubbing a gas stream containing sulfur oxide with an ammonium sulfite solution; and regenerating at least a portion of the ammonium compound by treating the resulting scrubber effluent with a source of calcium ions, wherein the precipitation of gypsum is discouraged to control the calcium concentration of the process liquor.

U.S. Pat. No. 3,870,781 discloses a process for treating sulfur oxide - containing gases which comprises scrubbing with an aqueous alkali metal hydroxide solution (e.g., NaOH) containing an alkaline earth metal sulfate (e.g., $CaSO_4$), converting (oxidizing) the resulting bisulfite ($NaHSO_3$) to the corresponding sulfate ($Na_2SO_4$) and hydrogen ions ($H_2SO_4$) and reacting these ions with an alkaline earth metal compound (e.g., $Ca(OH)_2$) to precipitate an alkaline earth metal sulfate ($CaSO_4$) and thereby reform the alkali metal hydroxide scrubbing solution. At column 3, lines 22-31, the patentees indicate that all sulfites are removed from the system to avoid scaling and plugging problems and that the air oxidation of the scrubber effluent eliminates $CO_2$ from the system thus preventing loss of alkali due to $CaCO_3$ precipitation.

U.S. Pat. No. 3,873,532 discloses a sodium based scrubbing process for removing sulfur dioxide from gases containing same and includes the following steps:

(1) scrubbing the gas with an aqueous alkali solution such as sodium hydroxide or sodium carbonate to produce an aqueous stream containing the corresponding sulfite and sulfate ions;

(2) splitting the scrubber effluent into two streams and recycling the major stream to the scrubbing step;

(3) reacting the minor stream with a calcium compound such as slaked lime to regenerate sodium hydroxide and precipitate out calcium as sulfite and sulfate;

(4) conveying the resulting suspension to a settling device and feeding the settler underflow to a filter wherein a minor portion of the underflow is recycled to the lime regeneration reaction, wherein the presence therein of the calcium sulfate crystals enhances the removal of calcium sulfite and sulfate from the reacted liquid; and (5) preferably, the overflow from the settling device is fed to a clarifier to which is also added sodium carbonate to reduce the concentration of dissolved calcium ions in the clarified regenerated scrubbing liquid, which is recycled back to the lime regeneration reaction. In one embodiment, a fraction of the exhaust gases from the scrubbing step is injected into the settler overflow fed to the clarifier wherein the carbon dioxide in the exhaust gases reacts with the calcium ions dissolved in that liquid stream to precipitate calcium carbonate and partially convert sodium hydroxide to sodium carbonate, the latter which then reacts with the calcium sulfate/sulfite in the system to reduce the amount of sodium carbonate required. It has been found however that the process described in this patent results in over-carbonization of the liquid in the clarifier. Specifically, it has been observed that sodium bicarbonate, $NaHCO_3$, is formed therein which in turn forms calcium bicarbonate, $CaHCO_3$, which is at least partially soluble in the clarifier. To the extent these bicarbonates are formed in the clarifier, there is no carbonate precipitate, instead a relatively gelatinous mass is formed which is difficult to filter. In addition, some make-up sodium carbonate is required.

SUMMARY OF THE INVENTION

The present invention broadly provides an improved double alkali process for the removal of sulfur oxides such as sulfur dioxide from a gas stream containing same. The soluble alkali used in the scrubbing step is formed in situ in the scrubbing step. For example, in a process for treating a waste gas from a coal-fired power plant, soluble alkali is leached from the fine particle-size ash carried to the scrubber and serves as the alkali make-up to the system. In addition, any carbonate required to soften the regenerated scrubbing liquor is also produced in situ in controlled amounts, thereby totally eliminating any need to supply additional make-up alkali to the system.

The double alkali process of the present invention has a number of advantages over other double alkali processes, for the following reasons. First, the need for supplying alkali make-up to the system is eliminated. Secondly, all the alkali carbonate required for softening may be produced in situ. Further, overcarbonization is prevented by controlling the amount of carbonate formed. Other advantages will be apparent from the detailed discussion hereinbelow.

BRIEF DESCRIPTION OF THE DRAWING

The FIGURE is a schematic diagram of one embodiment of the process of the present invention.

DESCRIPTION OF THE PREFERRED EMBODIMENTS

The process of the present invention is useful for treating gas streams, such as waste gases from power plants, containing sulfur oxides, particularly sulfur dioxides. A typical waste gas from a power plant or the like using a sulfur-containing fuel may contain sulfur dioxide in an amount of 0.05 to 0.5% by volume, together with entrained particulates (e.g., fly ash, soot, etc.), and have an elevated temperature generally in the range of about 300° to 500° F. If desired or necessary, the waste gas may be treated using known techniques prior to scrubbing to remove dry particulates, for example, by using conventional cyclones. It should be understood that the process of the present invention may be employed to treat any gas stream but it is particularly adapted and useful for removing sulfur dioxide ($SO_2$) from waste gas streams derived from coal-fired power plants. Therefore, for ease of description only, the gas being treated will be referred to herein as a "waste gas".

Waste gases from coal-fired power plants generally contain entrained solids such as ash derived from the coal and it is standard practice to remove the larger solid particles prior to scrubbing. However, some of the finer particles (containing alkali) are carried over to the scrubber and the present invention utilizes the alkali contained in such fine ash particles as the make-up alkali to the system. Regardless of the source of the waste gas, the present invention utilizes the alkali content of the solids carried over to the scrubber as alkali make-up.

The process of the invention generally comprises scrubbing a waste gas stream with a circulating alkali scrubbing solution, removing a portion of the resulting scrubber effluent as a bleed to a regeneration procedure and recycling the regenerated scrubbing liquor to the scrubbing step. As used herein, the term "alkali" is meant to include any alkali metal or like material which forms water-soluble sulfates or hydroxides, such as sodium, potassium, lithium, etc. As an example, in a coal-fired power plant, the fine ash particles, containing these alkalis, are carried over to the scrubber. The cinders and carbon of the ash are normally collected in the dry mechanical collectors used for the purpose, which permit the finer particles to pass through. The scrubbing step in the present invention is operated to leach out these alkalis from the ash as sulfates. One manner of operation to accomplish this object is to use a very low pH (e.g., on the order of 1–2) in a first stage of the scrubbing step. In the later regeneration procedure, these alkalis are recovered to keep them within the system for scrubbing. The only loss of alkali from the system is with the filter cake. Since some materials (e.g., high sulfur coals) do not contain sufficient alkali to make up for this loss, it may be necessary to rely on the amphoteric metals in the ash (e.g., aluminum, zinc, etc.) to make up the difference. Since aluminum oxides are a major constituent of coal ash, this is not a problem.

Thus, depending on the composition of the ash carried over to the scrubber, the actual scrubbing liquor will be different in each installation and will normally contain these soluble alkalis plus aluminum and/or zinc and like amphoteric metals. In any event, regardless of the particular alkali content of the ash, the active soluble "alkali" in the scrubbing liquor is in the form of sulfite/bisulfite. It should be noted that in a dilute double alkali process which employs a low pH leaching step as part of the scrubbing operation, as in a preferred embodiment of the present invention, most of the sulfite and bisulfite will be oxidized to sulfates. Since it is not intended to limit the present invention with respect to the composition of the scrubbing liquor, the scrubbing liquor alkali will be hereinafter referred to as the "alkali". It is to be understood however, that the term "alkali" as used herein for this purpose, is meant to include any material which forms soluble sulfates or hydroxides and which functions as an alkali in the scrubbing step.

The bleed from the scrubber effluent is subjected to regeneration by the following procedure:

(1) oxidizing the regeneration bleed and then reacting the oxidized material in a first stage reactor with a calcium carbonate slurry, whereby alkali bisulfite is oxidized to alkali sulfate and sulfuric acid in the oxidation step and the sulfuric acid reacts with the calcium carbonate in the first stage reactor to produce calcium sulfate and carbon dioxide, which may be stripped off by an air stream fed to the bottom of the first stage reactor;

(2) adding lime to the resulting product of (1) in a second stage reactor where it reacts with the alkali sulfate to regenerate the alkali scrubbing solution and produce additional calcium sulfate;

(3) thickening and filtering the reaction product of (2) and adding alkali carbonate to the filtrate and the thickener overflow in a clarifier to reduce the amount of dissolved calcium in solution by precipitating calcium carbonate;

(4) recycling a calcium carbonate slurry underflow from the clarifier to the first stage reactor;

(5) recycling the alkali hydroxide-containing clarifier overflow to the scrubbing step; and (6) removing a portion of the recycled alkali hydroxide and reacting it in a carbonizer with a controlled amount of carbon dioxide obtained from the flue gas vented from the scrubbing step to form all of the alkali carbonate required in step (3).

The double alkali process of the invention is preferably operated as a "dilute" double alkali (e.g., sodium) process, which means that the concentration of active alkali in the circulating aqueous scrubbing liquor is 0.15 molar or less, preferably. By "active alkali" is meant all soluble alkali in the form of sulfite, bisulfite, carbonate, bicarbonate and hydroxide. The concentration of active alkali in the scrubbing liquor may be controlled by regulating the pH in the second stage reactor. Since the concentration of active alkali in the scrubbing solution increases as the pH of the scrubbing solution increases, and since higher active alkali content in the scrubber solution favors enhanced $SO_2$ collection efficiency, it is desirable, and therefore preferred, to provide a relatively higher pH in that part of the scrubbing step during which $SO_2$ is absorbed as compared to that part in which the alkalis are leached from the solids fed to the scrubber. Of course, it is preferred that the entire system be operated in a dilute alkali mode, as pointed out above, which in turn would limit, to a degree, the pH obtainable in the $SO_2$-absorption operation.

One reason why it is preferred to operate in a dilute mode is that this favors significant oxidation of the collected $SO_2$ (to sulfate) in the scrubbing step, for the following reasons. The scrubbing solution can only absorb a limited amount of oxygen from the flue gas, which amount is a function of the percent oxygen in the flue gas and the absorbing characteristics (i.e., the chemical composition) of the scrubbing solution. Normally, the amount of oxygen that can be absorbed from flue gas is sufficient to oxidize only small amounts of $SO_2$ ($SO_3^=$ to $SO_4^=$). Therefore, in a dilute system (low concentrations of alkali bisulfite), there would be sufficient oxygen to oxidize practically all of the bisulfites to sulfates. In fact, it is preferred that at least 50% of the collected $SO_2$ in the scrubbing liquor be oxidized to sulfates in the scrubber, more preferably 80–90%. The degree of oxidation in the scrubber may be controlled by controlling the amount of excess air in the boiler or furnace from which the waste gas is derived, the higher the concentration of air the more oxidation occurs in the scrubber. Another means to obtain increased oxidation is to increase the residence time in the scrubber. If desired, additional oxidation may be achieved after the scrubbing stage by blowing air through the solution. In the most preferred embodiment, the operating conditions are adjusted to achieve substantially 100% oxidation of the bisulfites to sulfates.

As pointed out above, the present invention obtains the alkali for the process from the fine particles (e.g., ash, etc.) carried over to the scrubber. A convenient technique for obtaining such alkalis is to leach same from these fine particles in a low pH first stage of the scrubbing step prior to the SO$_2$-absorption second stage of the scrubbing step. In practice, the leaching may be performed as a first stage of the scrubber operation in a Venturi scrubber, for example, followed by the SO$_2$-absorption step. The absorption step of the process of the present invention is designed to operate at the lowest possible pH to provide the required SO$_2$ absorption. In practice, this can be regulated as desired to achieve the necessary SO$_2$ removal from the waste gas being treated. In this way, the bleed stream removed from the circulating scrubbing solution for regeneration will be capable of dissolving more lime thereby increasing the utilization efficiency of the lime in the regeneration step.

The Figure illustrates an embodiment of the present invention. The apparatus as shown includes a so-called multistage scrubbing system including a Venturi scrubber 10 as a first stage and an absorber 11 whose trays 19 constitute a second scrubbing stage 18. Referring to the Figure, a waste gas is fed to the Venturi 10 or similar device via stream 12. It may first be treated in a dry mechanical collector, as shown, to remove large dry particulates and the like, as is conventional in the art. It is mixed in the Venturi 10 with a circulating aqueous scrubbing or absorption solution which is fed to the Venturi 10 via lines 13 and 14. The resulting gas-liquid mixture is then delivered to an absorber 11 from which the scrubbed gas may be vented to the atmosphere. The lower portion of absorber 11 acts as a liquid-gas separator. The resulting scrubbing liquid effluent is removed from the bottom of absorber 11 in stream 17 which is split into two streams 15 and 16 for recycle to the Venturi 10 and as a bleed to the regeneration system, respectively. Make-up water may be provided, as necessary, to the lower portion of absorber 11.

As indicated above, the multi-stage absorbing operation includes a first stage which occurs in Venturi 10 and a second stage 18 which occurs in absorber 11. The first stage in Venturi 10, is a very low pH acidification (e.g., at a pH of about 1-2) primarily to leach out the alkalis from the fine particles carried to the scrubber/absorption system. Due to the extremely low pH, the SO$_2$ collection efficiency is very low. It is the second stage where most of the SO$_2$ collection is accomplished. Specifically, the second stage scrubbing is accomplished in absorber 11 by means of a plurality of trays 19, the number of trays being as many as are necessary to achieve the desired efficiency (packing may also be employed to obtain the desired effeciency, as is conventional), and is conducted at as low a pH as possible to achieve good SO$_2$ removal, normally in the order of about 5-7. The pH of the entire scrubbing operation may be controlled to achieve the desired degree of leaching in the first stage and the desired degree of SO$_2$ removal in the second stage. The liquid scrubbing solution is circulated to the second stage of the scrubbing operation through pump tank 21. Scrubbing liquid is removed from the second scrubbing stage in absorber 11 via line 20 and returned thereto via line 22 at which point it counter-currently contacts the gas rising through absorber 11 on trays 19. A portion of the scrubbing solution with the lowest pH (i.e., in stream 20) is fed to the lowermost portion of absorber 11 via streams 23 and 23a to provide low pH scrubbing solution to the regeneration procedure. The amount of scrubbing liquid required for circulation between the first and second stages of the scrubber is of course dependent on many factors, such as its pH, the SO$_2$ content of the waste gas, the alkali content of the ash particles carried to the scrubber, the desired alkali content of the scrubbing solution, etc., although in the present invention relatively large amounts of solution are desirable, on the order of about 10 to 50 gallons per thousand cubic feet of gas. The particular amount used is not critical and will vary depending upon the results desired.

The bleed from the scrubbing operation is fed via line 16 to the regeneration part of the process of the present invention. The regeneration bleed stream 16 generally has a very low pH, on the order of about 1-2 and, after regeneration, is returned to the scrubber loop at a high pH of on the order of 12-13. Therefore, a small bleed rate can be used thus requiring small size apparatus in the regeneration portion of the process. Of course, the bleed rate may be adjusted depending on the desired results and the thickener and clarifier, and other regeneration apparatus, may be sized accordingly.

The bleed stream 16 is first fed to an oxidizer 25 to which oxidizing air is fed by means of blower 29. The source of the oxidizing air is from a recirculated air/carbon dioxide mixture, obtained from stream 30 exiting the top of the stripper 27 through line 31 and also from fresh air stream 33. In oxidizer 25, the alkali bisulfite in the bleed stream is oxidized to the corresponding sulfate according to the following equation (using sodium as a typical alkali):

$$2NaHSO_3 + O_2 \rightarrow Na_2SO_4 + H_2SO_4 \quad (5)$$

The oxidized solution is fed into a stripper and first stage reactor 27 via line 26, to which is added a calcium carbonate slurry taken as underflow from a clarifier 46 and fed via lines 48 and 49. In the stripper and first stage reactor 27, the calcium carbonate reacts with the sulfuric acid formed in the oxidation step to precipitate calcium sulfate and produce carbon dioxide gas according to the following equation:

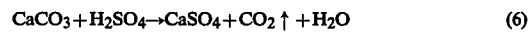

$$CaCO_3 + H_2SO_4 \rightarrow CaSO_4 + CO_2 \uparrow + H_2O \quad (6)$$

However, the carbon dioxide gas does not evolve and hence air may be fed to the bottom of the first stage reactor 27 via line 28 to strip the carbon dioxide from the solution. An advantage which results is that any remaining bisulfite may be oxidized to sulfate in the first stage reactor by virtue of this air stripping of CO$_2$. The upper portion of the first stage reactor 27 thereby functions as a liquid/gas separator and a gas mixture of air and CO$_2$ exits the first stage reactor via line 30. A portion of this gas stream is recycled via line 31 to be fed via blower 29 to the oxidation step and the remaining portion may be vented to the atmosphere via line 32. The pH of the liquid in the stripper and first stage reactor 27 is in the order of about 3-4.

Blower 29, which feeds oxidizing air to oxidizer 25, is arranged to recirculate some of the air/CO$_2$ mixture in stream 30 to the oxidizer 25 to reduce the amount of air vented to the atmosphere. Since absorption of air/oxygen is relatively inefficient (i.e., only about 10% or so of the oxygen in the stream fed to blower 29 will be absorbed in oxidizer 25, the air/oxygen flow in stream 31 will be equal to about 90% of stream 30.

The liquid effluent from the first stage reactor 27 is fed to a second stage reactor 35 via line 34, where it reacts with lime fed to the reactor from lime system 36 via line 37. Any conventional technique and apparatus may be employed to provide such lime, which is normally in its hydrated form, $Ca(OH)_2$. In the second stage reactor 35, which is normally at a high pH of about 12–13, the alkali sulfate in the liquid is reacted with the lime to precipitate calcium sulfate and regenerate alkali for the scrubbing step as alkali hydroxide, according to the following equation (using sodium as a typical alkali):

$$Na_2SO_4 + Ca(OH)_2 \rightarrow CaSO_4 \downarrow + 2NaOH \quad (7)$$

As shown, the second stage reactor may be provided with a stirring mechanism to provide the necessary contact between the lime and the alkali sulfate. The pH of the liquid in the second stage reactor is generally controlled by the amount of lime fed to the reactor.

The liquid second stage reactor product is removed from the second stage reactor 35 and fed, via line 38, to a thickener 39 where the precipitated solids settle out by gravity over a period of time. A predominantly liquid overflow, comprising predominantly alkali hydroxides is fed to clarifier 46 via line 41. The thickener underflow, containing a high proportion of suspended solids, is fed to a filter 42 via line 40, at which point it may be washed with water and filtered. The filtrate is fed to thickener 39 via line 45. In filter 42, the slurry is washed with at least one, and preferably at least two, volumes of water to recover as much alkali as possible and prevent undesirable loss of alkali in the filter cake which is removed from the system via line 44. The pH in the thickener 39 depends, of course, upon the pH in the second stage reactor, but may vary from about 11 to 13.

In the clarifier, the regenerated scrubbing solution is softened by adding alkali carbonate via line 58, which reduces the dissolved calcium concentration by precipitating calcium in the form of carbonate according to the following equation (using sodium as a typical alkali):

$$CaSO_4(dissolved) + Na_2CO_3 \rightarrow CaCo_3 \downarrow + Na_2SO_4 \quad (8)$$

The amount of alkali carbonate required to properly soften the regenerated scrubbing solution in the clarifier depends upon the amount of dissolved calcium in the thickener overflow, and further upon the degree to which dissolved calcium can be tolerated in the scrubbing part of the process. As indicated, in the clarifier, the dissolved calcium is precipitated as calcium carbonate and alkali sulfate is formed which is recirculated to the scrubbing step, conveniently through line 47 to a storage tank 50 and thereafter to the scrubbing step via line 51. This liquid contains alkali hydroxides and sulfates and other soluble alkali compounds, and possibly some small amount of dissolved calcium depending upon the amount of alkali carbonate fed to the clarifier in the softening step and how much can be tolerated in the scrubbing operation. Line 51 is split into two streams 24 and 52. Line 24 constitutes the majority of the recycled, regenerated scrubbing solution in line 51 and is fed to recycle or pump tank 21 for feeding to absorber 11. A minor portion of line 51 is fed, via line 52, to carbonizer 53 in which alkali hydroxide is reacted with carbon dioxide contained in the flue gas vented from the scrubbing step to form the necessary amounts of alkali carbonate required in the softening step according to the following equation (again using sodium as a typical alkali):

$$2NaOH + CO_2 \, Na_2CO_3 + H_2O \quad (9)$$

The carbonizer 53 may normally and conveniently comprise a miniature scrubbing system including a Venturi 54 and a liquid/gas separator 55. The alkali hydroxide-containing liquid is fed via line 52 to the Venturi 54 where it is therein contacted with the flue gas removed from the scrubber vent via line 57. The resulting liquid/gas mixture is fed to carbonizer 53 from which gas is recycled via line 56 to the scrubber vent and vented to the atmosphere. The liquid effluent from separator 55, containing alkali carbonate, is fed via line 58 to the clarifier 46 for softening.

In order to avoid overcarbonizing the regenerated scrubbing solution in the clarifier, the amount of alkali carbonate formed in carbonizer 53 may be controlled by in turn controlling the flow in line 52 or the amount of flue gas in line 57. A convenient way of controlling the amount of alkali carbonate which is formed is to control the amount of flue gas fed to the carbonizer. This may be done, for example, by monitoring the concentration of dissolved calcium in the regenerated scrubbing solution in line 51 or 52 and in turn regulating the amount of flue gas, containing $CO_2$, which is fed to the carbonizer via line 57. In this way, only the minimum necessary amount of $CO_2$ will be fed to carbonizer 53 and in turn only the minimum amount of alkali carbonate will be formed in the carbonizer as required for the softening step in clarifier 46.

A bleed/by-pass stream 23b (shown in dotted line) may also be provided to enable the pH of the first stage scrubber to be controlled by by-passing a portion, or even all of the solution (in stream 23) coming from the second stage scrubbing loop. In addition a collection sump 59 may be provided to collect all spills, leaks, and the like, in order to maintain the water balance when the system is not operating at 100% capacity. The water thus collected and additional water 60 as necessary, may be fed, via stream 61, to filter 42 as wash water and as other make-up water for the process, via stream 62.

The individual pieces of the apparatus employed in the scrubbing portion of the process of the invention may be any commercially available equipment, the purpose being to assure adequate contact between the waste gas and the circulating scrubbing or absorption solution to achieve the desired $SO_2$ removal. For example, the Venturi may be a variable throat Venturi such as the commercially available AirPol Basic Venturi Scrubber available from Neptune AirPol, Inc., Englewood, N.J., and described in U.S. Pat. No. 3,841,061. The absorber may be any of those which are commercially available. In addition, more than one set of Venturi scrubbers may be arranged in parallel in accordance with the present invention.

The individual pieces of apparatus employed in the regeneration stage may also be any commercially available equipment. For example, any conventional thickener, clarifier and filter can be employed.

The principal feature of the present invention is that the need for any alkali make-up has been eliminated since the alkali used for scrubbing is obtained from the alkali content of the materials entering the Venturi scrubber and since any alkali carbonate needed for softening may be formed in situ. The only loss of alkali is in the filter cake, and this is minimized or substantially eliminated by the water washing on the filter. There may be some small losses through spills, leaks, etc.

throughout the system, but such losses may be minimized or eliminated by collecting same in the collection sump 59 and returned to the system at a suitable point. This also has the effect of reducing or substantially eliminating losses of alkali from the system.

Another advantage of the process of the present invention is that the calcium carbonate precipitated in the clarifier is fed, with some of the regenerated scrubbing solution, to the first stage reactor/stripper to utilize the carbonate to react therein with the sulfuric acid instead of disposing of the carbonate with the filter cake as in some prior art double alkali processes. This avoids the necessity of having to replace calcium losses from the system with the filter cake, thus reducing lime consumption.

I claim:

1. In a double alkali process for removing sulfur oxides from a gas stream containing said sulfur oxides and entrained fine solid particles which contain alkali, which process comprises:

scrubbing said gas stream with a circulating aqueous alkali scrubbing solution containing alkali sulfite and alkali bisulfite to produce a liquid effluent containing relatively more alkali bisulfite and a second gas stream containing carbon dioxide and relatively less sulfur dioxide;

treating at least a portion of said effluent with lime to regenerate an alkali scrubbing solution containing alkali hydroxide;

softening the regenerated alkali scrubbing solution by treating with alkali carbonate to lower the concentration of dissolved calcium therein; and recycling the softened, regenerated scrubbing solution to the scrubbing step;

the improvement comprising eliminating the need for any external alkali make-up to the process by treating the fine solid particles entrained in said gas stream to remove soluble alkali therefrom and thereby establish said aqueous alkali scrubbing solution and by producing in situ, in controlled amounts, all of the alkali carbonate required for the softening step by reacting at least a portion of the alkali hydroxide in the recycled regenerated scrubbing solution with at least a portion of the carbon dioxide in said second gas stream and supplying the resulting alkali carbonate to said softening step.

2. The process of claim 1, wherein the concentration of active alkali in the circulating aqueous alkali scrubbing solution is 0.15 molar or less.

3. The process of claim 2, wherein at least 50% of the collected sulfur dioxide, as alkali bisulfite, is oxidized in the scrubbing step to alkali sulfate.

4. The process of claim 1, further comprising oxidizing said liquid effluent prior to lime addition.

5. The process of claim 3, including monitoring the level of dissolved calcium in said recycled regenerated scrubbing solution and controlling the amount of carbon dioxide gas fed to the reaction with alkali hydroxide as a function of said monitored dissolved calcium level, to provide a desired level of dissolved calcium in the scrubbing step.

6. The process of claim 1, further comprising thickening the regenerated scrubbing solution, filtering the thickener underflow and washing the filtered solids at least once with water, combining and feeding the filtrate and the wash water to said thickening step to produce a liquid overflow and slurry underflow and feeding said liquid overflow to said softening step.

7. The process of claim 6, further comprising collecting all liquid leaks from the process in a sump and recycling to the process.

8. A dilute double alkali process for the removal of sulfur dioxide from a gas stream containing sulfur dioxide and entrained fine solid particles which contain alkali, which eliminates the need for any external alkali make-up to the process, which process comprises:

(1) acid leaching soluble alkalis from said fine solid particles to thereby establish an aqueous alkali scrubbing solution;

(2) scrubbing the resulting gas stream with said aqueous alkali scrubbing solution, which circulates between said leaching and scrubbing steps, to produce a liquid effluent containing alkali sulfate and alkali bisulfite and a second gas stream containing carbon dioxide and relatively less sulfur dioxide;

(3) removing and subjecting a portion of said liquid effluent to oxidation to produce a second liquid stream containing sulfuric acid and relatively more sulfate;

(4) reacting said second liquid stream with a calcium carbonate slurry to produce a third liquid stream containing solid calcium sulfate and alkali sulfate;

(5) adding lime to said third liquid stream whereby the lime reacts with the alkali sulfate therein to precipitate more calcium sulfate and regenerate the alkali scrubbing solution as alkali hydroxide;

(6) thickening the combined product of step (5) and a liquid filtrate to produce a slurry underflow and a liquid overflow;

(7) filtering said thickener underflow to produce said liquid filtrate and a solid filter cake;

(8) combining and softening the thickener overflow and liquid filtrate by adding alkali carbonate thereto to precipitate solid calcium carbonate and produce a calcium carbonate slurry underflow and a regenerated scrubbing liquid overflow containing alkali hydroxide and alkali sulfate;

(9) recycling said calcium carbonate slurry to said reaction step (4) and recycling said regenerated scrubbing liquid overflow to said scrubbing step (2); and

(10) removing and reacting a portion of the alkali hydroxide in the recycled regenerated scrubbing solution with a controlled amount of the carbon dioxide in the second gas stream produced by the scrubbing step to produce all of the alkali carbonate necessary for said softening step (8) and feeding the resulting liquid containing alkali carbonate to said softening step (8).

9. The process of claim 8, wherein the concentration of active alkali in the circulating aqueous alkali scrubbing solution is 0.15 molar or less.

10. The process of claim 9, wherein substantially all of the collected sulfur dioxide, as alkali bisulfite, is oxidized in the scrubbing step to the corresponding sulfate.

11. The process of claim 10, including monitoring the level of dissolved calcium in said recycled regenerated scrubbing solution and controlling the amount of carbon dioxide gas fed to the reaction with alkali hydroxide as a function of said monitored dissolved calcium level, to provide a desired level of dissolved calcium in the scrubbing step.

12. The process of claim 11, further comprising collecting all liquid leaks from the process in a sump and recycling the collected liquid to the process.

13. A dilute double alkali process for removing sulfur dioxide from a waste gas stream derived from a coal-fired plant, which waste gas stream contains sulfur dioxide and fine solid ash particles entrained therein which are derived from said coal and contain alkali, which eliminate the need for any external alkali make-up to the process, which process comprises:

(1) acid leaching soluble alkali from said entrained particles at a pH of about 1 to 2 to establish an aqueous alkali scrubbing solution;

(2) scrubbing the resulting as stream with said aqueous alkali scrubbing solution, which circulates between said leaching and scrubbing steps, said solution containing alkali sulfate, alkali sulfite and alkali bisulfite, at a pH of about 5 to 7, wherein substantially all of the collected sulfur dioxide, as alkali bisulfite, is oxidized to alkali sulfate, to produce a liquid effluent containing relatively more alkali sulfate and relatively more alkali bisulfite and a second gas stream containing carbon dixoide and relatively less sulfur dioxide;

(3) removing and subjecting a portion of said liquid effluent to oxidation with air to produce a second liquid stream containing sulfuric acid and relatively more alkali sulfate;

(4) reacting said second liquid stream with a calcium carbonate slurry in a first stage reactor at a pH of about 5 to 7 to produce a liquid containing solid calcium sulfate, dissolved alkali sulfate and carbon dioxide gas;

(5) stripping said carbon dioxide gas from said first stage reactor with air and recycling a portion of the resulting air/carbon dioxide mixture to the oxidation step (3) as the oxidizing gas, wherein any remaining bisulfite is oxidized to sulfate in said first stage reactor;

(6) removing a third liquid stream from said first stage reactor and adding lime thereo to react with the alkali sulfate therein at a pH of about 12 to 13 to precipitate more solid calcium sulfate and regenerate the alkali scrubbing solution as alkali hydroxide;

(7) thickening the product of step (6) to produce a slurry underflow and a liquid overflow containing dissolved calcium ions;

(8) filtering said thickner underflow including washing the solids contained therein at least once with water to produce a liquid filtrate and a solid filter cake;

(9) combining and softening the liquid thickener overflow and liquid filtrate to reduce the concentration of dissolved calcium ions therein by adding alkali carbonate thereto to precipitate solid calcium carbonate and produce a calcium carbonate slurry underflow and a regenerated scrubbing liquid overflow containing alkali hydroxide and alkali sulfate;

(10) recycling said calcium carbonate slurry to said reaction step (4) and recycling said regenerated scrubbing liquid overflow to said scrubbing step (2); and

(11) removing and reacting a portion of the alkali hydroxide in the recycled regenerated scrubbing liquid with the carbon dioxide in the second gas stream produced by the scrubbing step, including monitoring the concentration of dissolved calcium ions in said recycled scrubbing liquid stream and controlling the amount of carbon dioxide fed to said reaction to thereby produce all of the alkali carbonate necessary for said softening step (9) and controlling the level of dissolved calcium in the recycled scrubbing liquid stream, and feeding the resulting alkali carbonate-containing liquid to said softening step (9).

14. The process of claim 13, wherein the concentration of active alkali in the circulating aqueous alkali scrubbing solution is 0.15 molar or less.

15. The process of claim 14, further comprising collecting all liquid leaks from the process in a sump and recycling the collected liquid to the process.

* * * * *

UNITED STATES PATENT AND TRADEMARK OFFICE
CERTIFICATE OF CORRECTION

PATENT NO. : 4,452,766
DATED : June 5, 1984
INVENTOR(S) : DANIEL E. PIKE

It is certified that error appears in the above-identified patent and that said Letters Patent is hereby corrected as shown below:

Col. 1, line 65     change "is" to -- its --

Col. 6, line 50     Change ,"$SO_2(SO_3^= \text{ to } SO_4 4)$." to

-- $SO_2(SO_3^= \text{ to } SO_4^=)$. --

Col. 13, line 11     Change "as" to -- gas --

Signed and Sealed this

*Nineteenth* Day of *February 1985*

[SEAL]

*Attest:*

DONALD J. QUIGG

*Attesting Officer*     *Acting Commissioner of Patents and Trademarks*